W. E. WORTH.
COTTON SEED DELINTER.
APPLICATION FILED AUG. 4, 1908.
983,527.
Patented Feb. 7, 1911.
2 SHEETS—SHEET 1.
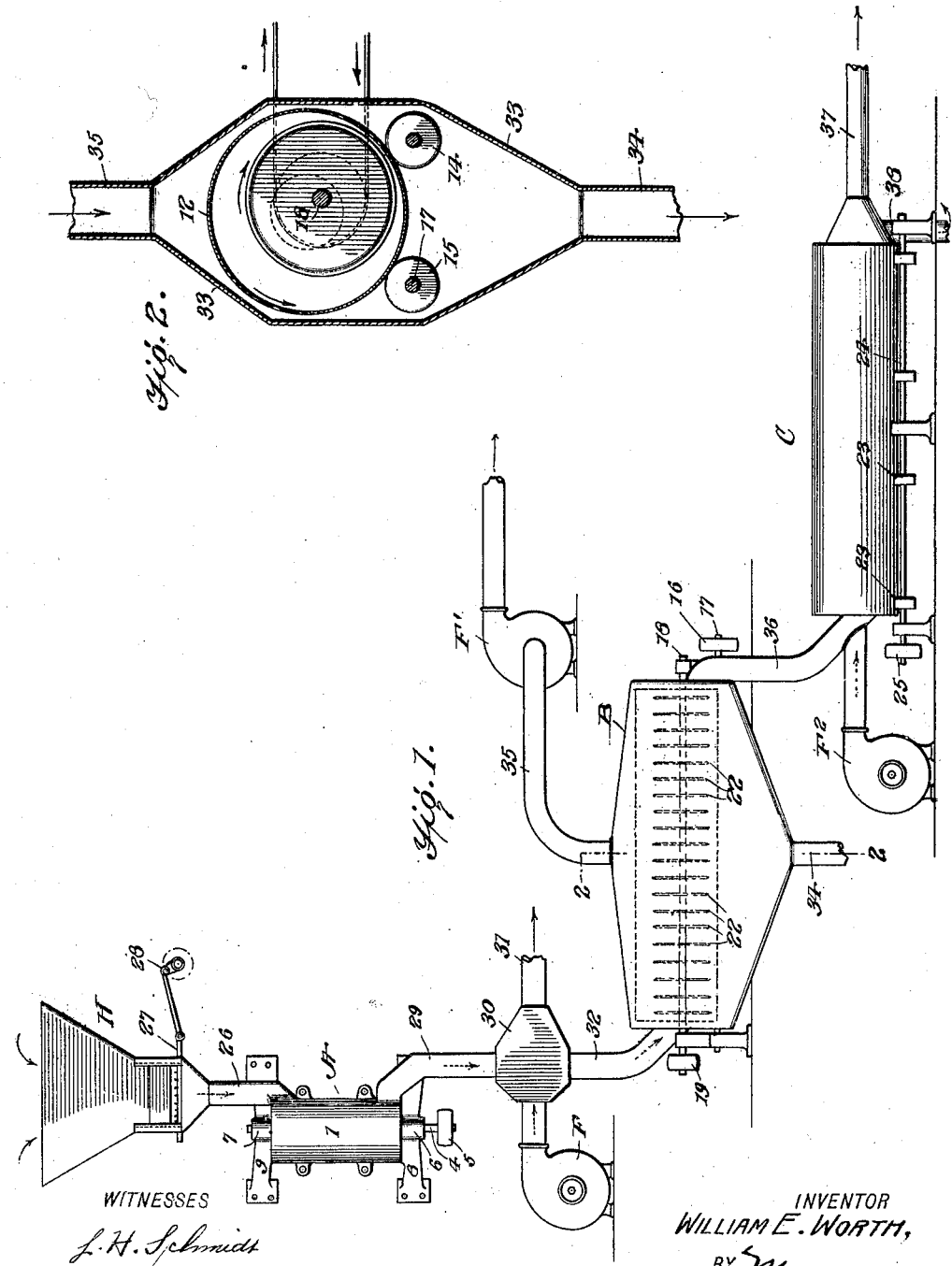
WITNESSES
INVENTOR
WILLIAM E. WORTH,
BY
ATTORNEYS W. E. WORTH.
COTTON SEED DELINTER.
APPLICATION FILED AUG. 4, 1908.
983,527.
Patented Feb. 7, 1911.
2 SHEETS—SHEET 2.
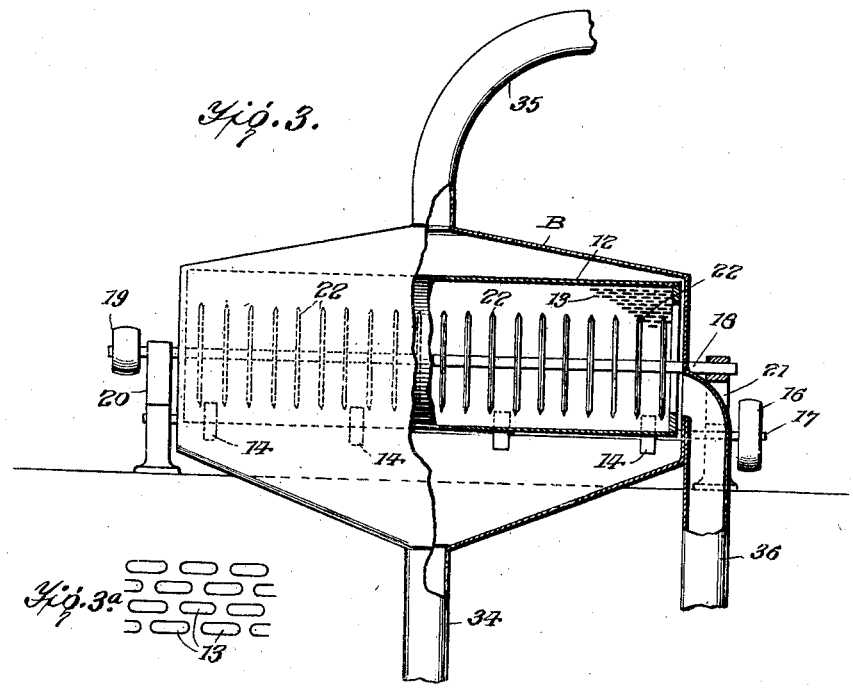
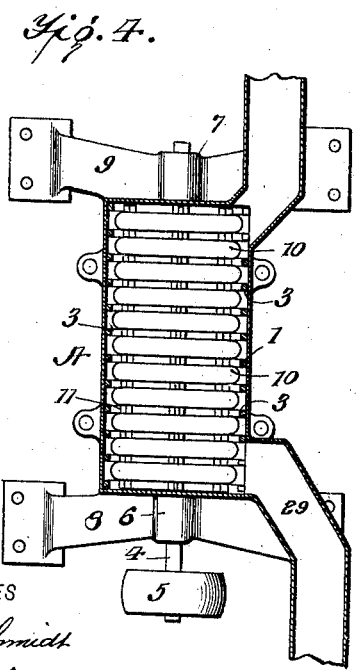
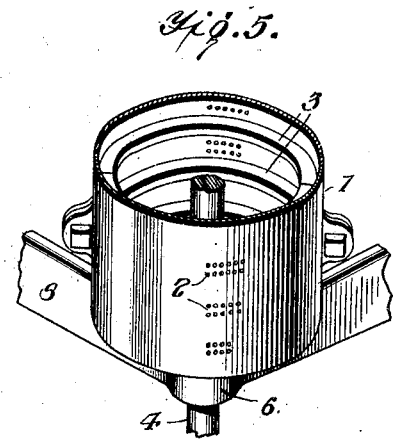
WITNESSES
INVENTOR
WILLIAM E. WORTH,
BY
ATTORNEYS

UNITED STATES PATENT OFFICE.

WILLIAM E. WORTH, OF WILMINGTON, NORTH CAROLINA, ASSIGNOR TO UNITED STATES COTTON SEED OIL COMPANY, OF PORTLAND, MAINE, A CORPORATION OF MAINE.

COTTON-SEED DELINTER.

983,527. Specification of Letters Patent. Patented Feb. 7, 1911.

Application filed August 4, 1908. Serial No. 446,969.

*To all whom it may concern:*

Be it known that I, WILLIAM E. WORTH, a citizen of the United States, and a resident of Wilmington, in the county of New Hanover and State of North Carolina, have made certain new and useful Improvements in Cotton-Seed Delinters, of which the following is a specification.

My invention relates to a machine for removing the lint from cotton seed, and separating the matured from the immatured and imperfect seeds.

The main object of my invention is to provide a device whereby cotton seed may be thoroughly delinted, cleaned and separated from the adhering lint so that the latter may be recovered in its entirety and the seed entirely denuded of lint and separated, the matured from the immatured, for planting.

My invention consists in the combinations, arrangements and constructions hereinafter described and claimed.

My invention is illustrated in the accompanying drawing, in which—

Figure 1 is a view showing the general arrangement of my improved delinting device. Fig. 2 is an enlarged section in detail along the line 2—2 of Fig. 1. Fig. 3 is a view partly in section showing the construction of the perforated horizontal cylinder. Fig. 3ª is a detail view showing the form and arrangement of the perforations in the horizontal cylinder. Fig. 4 is a sectional view of the vertical cylinder shown in Fig. 1. Fig. 5 is a perspective view of a portion of the interior thereof.

Referring now to Fig. 1, I have shown therein the main elements of my delinting device. These consist in an upright or vertical first delinting machine A, a horizontal second delinting machine B and a horizontal closed first delinting machine C.

The construction of the cylinder A is shown in Figs. 4 and 5. It consists of a cylindrical casing 1 provided with perforations 2 arranged in rows. Projecting inwardly on the interior of the casing are the flanges or baffles 3. These baffles consist merely of rings spaced apart at equal distances along the cylinder.

Disposed centrally of the cylinder is a vertical shaft 4 provided with a drive pulley 5, and arranged to be supported by, and to revolve in, the bearings 6 and 7 on the brackets 8 and 9. Secured to the shaft is a series of abrasive wheels, preferably emery wheels 10. These wheels fit closely together, but between each wheel and the adjacent one a groove 11 is provided for the passage of the seed as will be shown hereinafter. These grooves are located directly opposite the inner edges of the baffles or deflecting plates 3 so that in the passage of the seed downwardly the latter must take a zigzag path around the end of the abrasive wheel, and thence being deflected by the baffles into the grooves.

Fig. 3 shows the horizontal second delinting machine which I have denoted in general by B. It consists of a cylinder 12 having a series of staggered oblong perforations 13, such as shown in Fig. 3ª. The cylinder 12 is mounted to rotate upon the trundles or rollers 14 and 15, as shown in Fig. 2. The trundle 15 is an idle roller, while 14 is driven by means of pulley 16, which is carried on the shaft 17. Disposed within the cylinder 12, but eccentrically thereof, is a shaft 18, which is driven by a pulley 19 on one end. The shafts 17 and 18 are journaled in supports 20 and 21, at each end of the cylinder. Disposed on the shaft 18 within the cylinder 12 is a series of abrasive wheels reaching nearly to the bottom of the cylinder 12 and being spaced about two inches apart longitudinally of the shaft, and, as the average greatest dimension of a cotton seed is in the neighborhood of one-third of an inch, the disks are therefore spaced apart from one another several times the average greatest dimension of the individual seeds operated upon.

The cylinder 12 is arranged to be rotated in one direction as shown by the arrow in Fig. 2, while the wheels 22 are rotated independently of the cylinder 12 in the opposite direction.

The special purpose of the horizontal steel cylinder shown at C is to polish the seeds after they have been denuded of their lint, and this is accomplished by rotating the seeds in the interior of the cylinder, which is mounted on the trundles 23 carried by the shaft 24, the latter being rotated in turn by the pulley 25.

The general arrangement of the various parts of my improved apparatus is shown in Fig. 1. A hopper H is designed to contain the seeds which are fed into the vertical cylinder through the pipe 26, by means of the automatic feed 27 operated by the crank mechanism 28. The outlet pipe 29 leads to the chamber 30, which is connected on one side with a fan F and on the other side with a discharge pipe 31. Another discharge pipe 32 leads from the bottom of the chamber 30 into the cylinder 12. The latter cylinder, together with its trundles, is inclosed by the casing 33, shown in section in Fig. 2. At the bottom of this casing is the discharge pipe 34, while at the top is the pipe 35 leading to a suction fan F'. At the opposite end from the pipe 32 is a discharge pipe 36 which communicates with the interior of the horizontal polishing cylinder C, and is connected with a fan $F^2$. At the opposite end of this cylinder C are two pipes, one located centrally of the cylinder and designated as 37, and the other a downwardly inclined pipe 38 for the discharge of the delinted seeds.

From the above description of the various parts of the delinting apparatus the operation of the device may be readily understood. The seeds are placed within the hopper H and are automatically fed through the pipe 26 into the top of the first delinting machine A. They pass through this from top to bottom by gravity. During their movement the abrasive wheels remove a large portion of the lint, which, together with the seeds, passes around the baffles in a zigzag course until the bottom of the cylinder is reached, whence the seeds, together with the lint, fall down the pipe 29. A strong current of air coming from the fan F blows the detached lint out through the pipe 31 where it may be deposited in any convenient receptacle communicating therewith. The seeds, owing to the slanting bottom of the chamber 30, are collected and fall through the chute 32 into the revolving cylinder 12.

In the cylinder 12 the seeds are constantly carried up between the abrasive wheels 22 and the interior wall of the cylinder. This removes any lint that might not have been removed by the first delinting machine A. As additional seeds come into the cylinder 12 those within the cylinder are crowded to the other end and during the time of passage through the cylinder, they are almost completely denuded of their lint. All immature and imperfect seeds will be separated from the mature seeds and will fall through the openings 13 in the cylinder 12 into the casing 33 and will be discharged through the pipe 34. The removal of the free lint is accomplished by means of the suction fan F' which draws the lint up through the pipe 35. On reaching the opposite end of the cylinder 12 the seeds overflow into the pipe 36 and are conveyed into the horizontal polishing cylinder C. Any possible lint which remains with the seeds is blown out through a pipe 37 by means of the fan $F^2$. As the seeds continue to come into the cylinder C from the pipe 36, they gradually work their way to the other end and overflow into the pipe 38 in a delinted, clean and polished condition.

In delivering cotton seed it has been found to be comparatively easy to remove the lint from the middle portion of the seeds, but extremely difficult to remove the tufts of lint from the ends of the seeds. The first delinting machine A of my delinting device is intended to remove the lint from the middle portion of the seeds, and is designed with especial reference to that function, while the second delinting machine B of my delinting device contributes to the final result by removing the tufts of lint at the ends of the seeds and not removed by the first delinting machine, from the seeds.

It will be understood that as the cylinder 12 rotates in the direction indicated it will tend to carry the mass of seed within it in the direction in which it rotates, and that the rotation of the shaft 18 and abrasive disks 22 in an opposite direction will tend to counteract that tendency. The disks 22 extend into the mass of seed within the cylinder 12 as has been explained, and the location of the axis of the shaft 18 is such that the disks will act most effectively upon the seed.

Referring to Fig. 2, the mass of seed will take a position with its surface inclined downward and toward the left, and the center of gravity of the mass will be near to the shortest line between the axis of the shaft 18 and the rotating cylinder 12.

I claim—

1. In a cotton seed delinter, a perforated horizontal cylinder mounted rotatably upon trundles, a horizontal shaft mounted eccentrically within said cylinder, a series of abrasive wheels mounted on said shaft, an inclosing casing communicating with the suction fan, and inlet and outlet pipes communicating with said horizontal cylinder.

2. In a cotton seed delinting device, a first delinting machine, a supply conduit leading thereinto and a single discharge conduit leading therefrom and through which both the seed and lint are discharged; a second and horizontally arranged delinting machine comprising a rotating cylinder, a rotating horizontal shaft extending therethrough and a plurality of abrasive disks carried by said shaft and spaced apart from one another, the distance between adjacent disks being several times the average greatest dimension of the individual seeds operated upon; means for separating the lint removed from the seed by said first delinting machine from the seed before the seed is supplied to said rotating cylinder; a conduit for supplying seed to said rotating cylinder; means for separating the lint removed from the seed by said second delinting machine from the seed; and a discharge conduit leading from said rotating cylinder and through which the cleaned seed is discharged therefrom.

3. In a cotton seed delinting device, a first delinting machine, a supply conduit leading thereinto and a single discharge conduit leading therefrom and through which both the seed and lint are discharged; a second and horizontally arranged delinting machine comprising a rotating cylinder, a rotating horizontal shaft extending therethrough and a plurality of abrasive disks carried by said shaft and spaced apart from one another, the distance between adjacent disks being several times the average greatest dimension of the individual seeds operated upon and the axes about which said cylinder and shaft rotate being parallel with but spaced apart from one another; means for separating the lint removed from the seed by said first delinting machine from the seed before the seed is supplied to said rotating cylinder; a conduit for supplying seed to said rotating cylinder; means for separating the lint removed from the seed by said second delinting machine from the seed; and a discharge conduit leading from said rotating cylinder and through which the cleaned seed is discharged therefrom.

4. In a cotton seed delinting device, a first delinting machine, a supply conduit leading thereinto and a single discharge conduit leading therefrom and through which the seed and lint are discharged; a second and horizontally arranged delinting machine comprising a perforated rotating cylinder, a casing surrounding said cylinder, a rotating horizontal shaft extending through said cylinder and a plurality of abrasive disks carried by said shaft and spaced apart from one another, the distance beween adjacent disks being several times the average greatest dimension of the individual seeds operated upon; means for separating the lint removed from the seed by said first delinting machine from the seed before the seed is supplied to said rotating cylinder; a conduit for supplying seed to said rotating cylinder; means for causing a current of air to flow through the casing which surrounds said perforated rotating cylinder; and a discharge conduit leading from said rotating cylinder and through which the cleaned seed is discharged therefrom.

5. In a cotton seed delinting device, a first delinting machine, a supply conduit leading thereinto and a single discharge conduit leading therefrom and through which the seed and lint are discharged; a second and horizontally arranged delinting machine comprising a perforated rotating cylinder, a casing surrounding said cylinder, a rotating horizontal shaft extending through said cylinder and a plurality of abrasive disks carried by said shaft and spaced apart from one another, the distance between adjacent disks being several times the average greatest dimension of the individual seeds operated upon, and means for rotating said cylinder and said shaft in opposite directions; means for separating the lint removed from the seed by said first delinting machine from the seed before the seed is supplied to said rotating cylinder; a conduit for supplying seed to said rotating cylinder; means for causing a current of air to flow through the casing which surrounds said perforated rotating cylinder; and a discharge conduit leading from said rotating cylinder and through which the cleaned seed is discharged therefrom.

6. In a cotton seed delinting device, a first delinting machine, a supply conduit leading thereinto and a single discharge conduit leading therefrom and through which both the seed and lint are discharged; a second and horizontally arranged delinting machine comprising a rotating cylinder, a rotating horizontal shaft extending therethrough and a plurality of abrasive disks carried by said shaft and spaced apart from one another, the distance between adjacent disks being several times the average greatest dimension of the individual seeds operated upon and the axes about which said cylinder and shaft rotate being parallel with but spaced apart from one another; and means for rotating said cylinder and said shaft in opposite directions; means for separating the lint removed from the seed by said first delinting machine from the seed before the seed is supplied to said rotating cylinder; a conduit for supplying seed to said rotating cylinder; means for separating the lint removed from the seed by said second delinting machine from the seed; and a discharge conduit leading from said rotating cylinder and through which the cleaned seed is discharged therefrom.

7. In a cotton seed delinting device, a first delinting machine comprising a casing provided with a plurality of rotative abrasive disks, a supply conduit leading thereinto and a single discharge conduit leading therefrom and through which both the seed and lint are discharged; a second and horizontally arranged delinting machine comprising a rotating cylinder, a rotating horizontal shaft extending therethrough and a plurality of abrasive disks carried by said shaft and spaced apart from one another, the distance between adjacent disks being several times the average greatest dimension of the individual seeds operated upon; means for separating the lint removed from the seed by said first delinting machine from the seed before the seed is supplied to said rotating cylinder; a conduit for supplying seed to said rotating cylinder; and a discharge conduit leading from said rotating cylinder and through which the cleaned seed is discharged therefrom.

WILLIAM E. WORTH.

Witnesses:
 JAMES W. COLLINS,
 BENJAMIN A. MERRITT.